United States Patent Office 3,140,308
Patented July 7, 1964

3,140,308
COLORED 1:1 PI COMPLEXES OF TETRACYANO-
ETHYLENE AND AROMATIC COMPOUNDS
Theodore Le Sueur Cairns, Greenville, Del., and Edith
Graef McGeer, Vancouver, British Columbia, Canada,
assignors to E. I. du Pont de Nemours and Company,
Wilmington, Del., a corporation of Delaware
No Drawing. Filed May 28, 1959, Ser. No. 816,384
14 Claims. (Cl. 260—465)

This invention relates to new chemical compounds based on tetracyanoethylene and is more particularly concerned with Pi complexes formed by tetracyanoethylene with aromatic compounds.

This application is a continuation-in-part of applicants' copending application Serial No. 382,842, filed September 28, 1953, which is in turn a continuation-in-part of applicants' then copending and subsequently abandoned application Serial No. 311,544, filed September 25, 1952. The invention claimed in the copending application is concerned with the discovery of tetracyanoethylene and its preparation. Tetracyanoethylene is a unique compound which differs remarkably in properties from previously known partially cyano-substituted ethylene, as disclosed in the copending application. These properties make possible the preparation of a great number of unusual derivatives, providing a breakthrough into a vast new field of research.

The present invention has as one object the preparation of a highly novel and valuable class of tetracyanoethylene derivatives. Another object is to provide such derivatives which have unique properties as coloring materials. Other objects will become apparent from the specification and claims.

In accordance with the present invention it has been found that reaction of tetracyanoethylene with any of the aromatic hydrocarbons, oxysubstituted aromatic hydrocarbons, and other electropositively substituted aromatic hydrocarbons will produce 1:1 Pi complexes which are characteristically colored. Preferred coreactants with tetracyanoethylene are unsubstituted and electropositively substituted carbocyclic aromatic hydrocarbons of up to 16 carbon atoms and free from aliphatic unsaturation. The reaction takes place upon merely mixing the reactants alone or in an inert solvent or solvents. Any convenient temperature up to about 80°–100° C. can be used, but low temperature is sometimes desirable to avoid or suppress other reactions. In those instances wherein the aromatic reactant is a solid like tetracyanoethylene, the Pi complex can be made by simply mixing the two solids and suitably grinding them together as in a mortar. In those instances wherein the aromatic reactant is a liquid, it may serve as a solvent medium when used in mild excess or can be simply mixed with the solid tetracyanoethylene in stoichiometric quantities and the reaction mixture, if desired, heated slightly. In those instances where the aromatic reactant is solid but exhibits an appreciable vapor pressure like tetracyanoethylene does, either under slightly elevated temperature or under greatly reduced pressure, the vapors from the tetracyanoethylene and the solid aromatic reactant can be brought together in a suitable reaction zone and the Pi complex formed thereby.

The aromatic reactant can have a structure composed exclusively of rings, e.g., benzene, naphthalene, anthracene, pyrene or fluorene, or may be hydrocarbyl- or oxysubstituted, preferably lower alkyl- or lower alkoxy-substituted, e.g., toluene, durohydroquinone, xylene, anisole, 2,6-diphenylnaphthalene, trimethoxybenzene, durene or hexamethylbenzene. The reactant can have aromatic rings linked by saturated aliphatic carbon. Other substituents can be present provided that they are electropositive, i.e., not electronegative, i.e., are not meta-orienting in character. Suitable amino- and hydrocarbylamino-substituted, preferably lower alkylamino-substituted, aromatic reactants are illustrated by diaminodurene, diaminonaphthalene, and N,N,N',N'-tetramethyl-p-phenylenediamine. Suitable halo- and halocarbyl-substituted, preferably halo lower alkyl-substituted, aromatic reactants are illustrated, respectively, by 2,3,5,6-tetrachloroanthracene and bis(chloromethyl)durene. The aromatic reactant can also have more than one type of these permitted nonelectronegative substituents. For instance, o-chloro-N,N,N',N'-tetramethyl-p-phenylenediamine is a suitable aromatic reactant.

These Pi complexes differ from ordinary reaction products in which there has been a molecular transformation. They are donor-acceptor complexes involving a Pi electron charge transfer from the aromatic compound to the tetracyanoethylene. There is no elimination of a molecule of HCN, etc., as would be the case in a condensation reaction; the atomic arrangement of the two molecules is unchanged. The formation of these 1:1 Pi complexes, therefore, involves the type of charge-transfer reaction known to take place between a Lewis base (Pi electron donor) and a Lewis acid (acceptor).

Tetracyanoethylene can be prepared by reaction of sulfur monochloride with malononitrile. The reaction can be carried out in the absence of a diluent, but a diluent is desirable to control the exothermic nature of the reaction. Suitable diluents include chloroform, carbon tetrachloride, tetrachloroethylene, benzene, toluene, and xylene. Water should be excluded.

The ratio of sulfur monochloride to malononitrile is not highly critical, but the molar ratio of these reactants should be kept within the range of 1:2 and 2:1, and preferably at 1:1, for best results. The reaction occurs slowly at temperatures as low as 25° C. It is advantageous, however, to operate in the range of 50° C. to 125° C.

The exact course of the reaction by which tetracyanoethylene is formed is not known, but the over-all reaction is as follows:

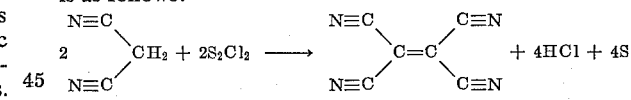

Tetracyanoethylene is a white crystalline solid which melts in a sealed tube at 195° C.–200° C. It sublimes when dropped on a melting block at 120° C.–150° C. Tetracyanoethylene is soluble in alcohol and acetone, sparingly soluble in water, chloroform, and diethyl ether, and essentially insoluble in petroleum ether (B.P. 30° C.–60° C.).

Tetracyanoethylene is chemically unique among the substituted ethylenes in that it is composed entirely of carbon and nitrogen. The structure of tetracyanoethylene, as indicated in the equation above, shows the very high degree of unsaturation possessed by this molecule. All this unsaturation occurs in conjugated positions, the terminal triple bonds being doubly conjugated with both of the triple bonds in the cyano groups which are attached to the opposite carbon of the central ethylene unit.

Tetracyanoethylene is a paradox insofar as properties are concerned. It is highly stable in the sense that it does not decompose at its high melting point and, even though it is a high melting solid, it is sufficiently volatile that it may be obtained in a high state of purity by sublimation. In spite of its high degree of unsaturation, it is not affected by oxygen at temperatures up to 200° C. nor does it add bromine, although ready absorption of bromine is a common criterion for determining the presence of ethylenic unsaturation.

Solutions of tetracyanoethylene tend to be highly colored. This is due to the fact that tetracyanoethylene enters readily into chemical associations and Lewis acid-Lewis base complex formation.

As will be seen from the following table, the 1:1 Pi complexes, which form immediately when tetracyanoethylene is dissolved in aromatic compounds, are visibly colored and show corresponding light absorption maxima. The unusually high stability of these complexes is evident from the high values of the equilibrium constant for the formation of the complexes.

TABLE

| Pi Complex of Tetracyanoethylene with— | Color | Wave Length of Maximum Light Absorption (A.) | Second Light Absorption Maximum, if present (A.) | Equilibrium Constant for Complex Formation (K) |
|---|---|---|---|---|
| Benzene | Bright yellow | 3,840 | | 2.00 |
| Toluene | Orange | 4,060 | | 3.70 |
| o-Xylene | Orange-red | 4,300 | | 6.97 |
| m-Xylene | do | 4,400 | | 6.00 |
| p-Xylene | do | 4,600 | 4,150 | 7.64 |
| Anisole | Wine-red | 5,070 | 3,840 | 4.42 |
| Fluorene | Violet | 5,700 | 4,160 | 18.0 |
| Pyrene | Deep blue | 7,240 | 4,950 | 29.5 |

The formation of these characteristically colored complexes, particularly when combined with measurement of the wave length of maximum light absorption, makes tetracyanoethylene highly useful as a rapid means for the detection and identification of aromatic compounds.

The following examples, in which proportions are by weight unless otherwise stated, illustrate the preparation of crystalline Pi complexes of tetracyanoethylene:

*Example I*

A solution of tetracyanoethylene in chloroform was added at room temperature to a chloroform solution of diaminodurene. A microcrystalline black solid separated which, after isolation by filtration and subsequent drying, was found to exhibit a color change to orange at 155° C. and to melt with decomposition at 197–199° C.

The preparation was repeated by adding a solution of 0.164 part of diaminodurene in about 10 parts of tetrahydrofuran to a solution of 0.125 part (an equimolar proportion based on the diamine) of tetracyanoethylene in about 20 parts of tetrahydrofuran. Greenish black platelets of the 1:1 diaminodurene:tetracyanoethylene Pi complex separated and were collected by filtration. After drying, electron paramagnetic resonance analysis indicated the product to be paramagnetic, i.e., a strong EPR absorption was exhibited. The infrared spectrum indicated strong broad absorption in the near infrared region around 0.5 to 2.0 micron, centering around 1.0 micron.

*Analysis.*—Calcd. for $C_{16}H_{16}N_6$: C, 65.7%; H, 5.5%. Found: C, 65.3%; H, 5.9%.

Similar results were obtained using chloroform as the preparative solvent. Thus, a solution of 0.164 part of diaminodurene in about 15 parts of chloroform was added to a hot solution of 0.128 part (an equimolar proportion based on the diamine) of tetracyanoethylene in about 150 parts of chloroform. The 1:1 Pi complex separated as shiny blue-black platelets which, on being heated on a melting point block, changed to a light green color at 144° C. and decomposed at 196–200° C. The yield was 0.28 part, corresponding to 96% of theory.

*Analysis.*—Calcd. for $C_{16}H_{16}N_6$: C, 65.7%; H, 5.5%. Found: C, 65.3%; H, 5.4%.

A colored pattern was made by rubbing the complex on the surface of a piece of paper. This pattern was easily copied using a commercial thermographic copying machine and method as described in U.S. 2,740,895 and 2,740,896.

*Example II*

To a saturated solution of tetracyanoethylene in chloroform was added a chloroform solution of 1,5-diaminonaphthalene. The blue-black microcrystalline tetracyanoethylene/1,5-diaminonaphthalene Pi complex separated and, after removal by filtration and subsequent drying, was found to exhibit a melting point of 120–122° C. with decomposition.

The preparation was repeated by adding a solution of 0.158 part of 1,5-diaminonaphthalene in about 15 parts of chloroform to a hot solution of 0.128 part (an equimolar proportion based on the diamine) of tetracyanoethylene in about 110 parts of chloroform. On cooling the resultant solution to room temperature, a black precipitate of the Pi complex was obtained. After removal by filtration and subsequent drying, there was thus obtained 0.10 part (35% of theory) of the 1:1 tetracyanoethylene/1,5-diaminonaphthalene Pi complex as black, shiny needles.

*Analysis.*—Calcd. for $C_{16}H_{10}N_6$: C, 66.9%; H, 3.5%; N, 29.5%. Found: C, 66.9%; H, 3.6%; N, 29.2%.

The complex is paramagnetic as indicated by an electron paramagnetic resonance absorption. The infrared spectrum indicated strong absorption in the near infrared region. Image patterns of the solid complex on paper were easily copied by the method described in Example I.

*Example III*

A mixture of 1.68 parts of 1,3,5-trimethoxybenzene and 1.28 parts (an equimolar proportion based on the trimethoxybenzene) of tetracyanoethylene was placed in an open, shallow, glass reactor. The container was covered with a glass plate and the combination then heated at steam bath temperatures. The reaction mixture melted and assumed a deep purple color. As heating was continued, long brown, shiny needles of the 1:1 tetracyanoethylene/trimethoxybenzene Pi complex sublimed. On examination, the needles were found to exhibit a melting point of 73–76° C.

*Analysis.*—Calcd. for $C_{15}H_{12}N_4O_3$: C, 60.8%; H, 4.1%. Found: C, 60.1%; H, 3.9%.

*Example IV*

To a solution of 0.128 part of tetracyanoethylene in about 40 parts of methylene chloride was added a solution of 0.164 part (an equimolar proportion based on the tetracynoethylene) of N,N,N',N'-tetramethyl-p-phenylenediamine in about 13.5 parts of methylene chloride. The reaction mixture turned black and greenish black platelets separated and were collected by filtration. The freshly prepared 1:1 tetracyanoethylene/N,N,N',N'-tetramethyl-p-phenylenediamine Pi complex dissolved in acetone to give a red-blue fluorescent solution. On standing overnight, the crystalline complex decomposed to a brown paste.

*Example V*

To a solution of 0.15 part of tetracyanoethylene in about 13.5 parts of methylene chloride was added a solution of 0.4 part (1.67 molar proportions based on the tetracyanoethylene) of pyrene in about 27 parts of methylene chloride. The resulting purplish black solution was cooled in an ice/water bath and the black crystalline material removed by filtration. After drying, there was obtained 0.15 part (about 37% of theory) of the 1:1 tetracyanoethylene/pyrene Pi complex as black platelets melting at 196–198° C. (sealed tube).

*Analysis.*—Calcd. for $C_{22}H_{10}N_4$: C, 80.0%; H, 3.0%. Found: C, 79.8%; H, 3.1%.

The Pi complex dissolved in acetone to form a colorless solution. However, evaporation of the acetone redeposited the black platelets of the complex.

A mixture of 0.70 part of pyrene and 0.30 part of tetracyanoethylene in about 75 parts of methylene chloride was cooled in an ice/water bath and seeded with a crystal of of the above Pi complex. After standing under these conditions for five hours, the solid black product was removed by filtration. The 1:1 Pi complex was thus obtained as mixed platelets and large black needles up to 12 mm. in length and about 1 mm. across.

Example VI

In about 27 parts of methylene chloride there was dissolved 0.128 part of tetracyanoethylene and 0.162 part (an equimolar proportion based on the tetracyanoethylene) of hexamethylbenzene. The solvent was evaporated under a stream of nitrogen from the resulting purple solution. The resulting residue (shiny golden-brown needles) was heated slowly at 80° C. under a pressure corresponding to 20 mm. of mercury to remove a small amount of excess tetracyanoethylene. The pressure was then reduced to 0.2 mm. of mercury and the pure 1:1 tetracyanoethylene/hexamethylbenzene Pi complex was sublimed as glistening golden-red needles, melting at 210° C. atmospheric (sealed tube), to form a purple melt.

*Analysis.*—Calcd. for $C_{18}H_{18}N_4$: C, 74.5%; H, 6.2%. Found: C, 74.4%; H, 6.5%.

A solution of 0.256 part of tetracyanoethylene and 0.640 part (2.0 molar proportions based on the tetracyanoethylene) of hexamethylbenzene in about 27 parts of methylene chloride was cooled in an ice/water bath. The solid thus formed was removed by filtration and after drying there was thus obtained 0.15 part (about 26% of theory) of the 1:1 tetracyanoethylene/hexamethylbenzene Pi complex as glistening brown needles.

The tetracyanoethylene starting material can be prepared by a vapor-phase reaction of malononitrile with chlorine or heavier halogen, or by the reaction of dihalomalononitrile with a metal or metal cyanide, in accordance with U.S. Patents 2,794,823 and 2,794,824, issued June 4, 1957 to R. E. Heckert and to Heckert and Little, respectively, and assigned to the assignee of the present invention. The following example illustrates the prepartion of tetracyanoethylene from malononitrile and sulfur monochloride:

Example VII

Seventy parts of sulfur monochloride was added slowly during the course of six hours to a refluxing solution of 33 parts of malononitrile in about 600 parts of chloroform. After the mixture was refluxed for an additional 20 hours, the chloroform was boiled off on a steam bath. An exothermic reaction, which deposited a crystalline solid on the walls of the container, occurred during the last stages of this operation. The residue was extracted exhaustively with diethyl ether in a Soxhlet extractor. On evaporation to dryness, the ether extract deposited 18 parts of crude tetracyanoethylene, which was purified by sublimation at 100° C. under reduced pressure (1 to 2 mm.). Analyses of a sample recrystallized from diethyl ether gave the following results.

*Analysis.*—Calcd. for $C_6N_4$: C, 56.3%; N, 43.7%; mol. wt., 128. Found: C, 56.45%, 56.33%; N, 43.23%, 43.18%; mol. wt., 132, 132.

The infrared spectrum of the product contained a divided band characteristic of conjugately unsaturated nitriles, i.e., at 4.42 microns (2262 cm.$^{-1}$) and 4.49 microns (2227 cm.$^{-1}$). As indicated in the above example, tetracyanoethylene can be isolated from the reaction mixture after evaporation of the reaction diluent by extraction with a selective solvent such as diethyl ether. Tetracyanoethylene can also be isolated by sublimation; in fact, crystals of sublimated tetracyanoethylene are usually found on the walls of the container after evaporation of the diluent from the reaction mixture.

The examples have illustrated the preparation of tetracyanoethylene Pi complexes with a variety of aromatic compounds, including substituted aromatic compounds. Aromatic hydrocarbons and the closely related ethers are eminently suitable. As to other substituted aromatic compounds, those must be excluded which have electronegative substituents since such substituents tend to negate the donor propensities of the Pi orbitals in the multiple linkages between the carbon atoms in the aromatic nuclei. Accordingly, aromatic compounds carrying such substituents are not normally Pi bases; if anything, in the case of the strongest electronegative substituents, such aromatic compounds would be Pi acids, and it is fundamental that such aromatic compounds would not form the desired Pi complexes with tetracyanoethylene. These electronegative substituents can also be classed as those substituents which, when present on ring carbon of an aromatic nucleus, tend to direct any entering substituent radical into the meta-position, i.e., the so-called meta-orienting groups. These substituents have also been described by Price, Chem. Rev. 29, 58 (1941), in terms of the electrostatic polarizing force, as measured in dynes, of the said substituent groups on an adjacent double bond of a benzene nucleus. Quantitatively, any substituent which has or exhibits an electrostatic polarizing force in dynes greater than 0.50 can be regarded as meta-orienting and electronegative and is not permitted here.

Aromatic hydroxy compounds and aromatic amine and substituted amine compounds are operable as aromatic Pi bases for forming aromatic/tetracyanoethylene Pi complexes. However, as disclosed by R. E. Heckert in U.S. Patents 2,762,810, 2,762,832 and 2,762,833, issued September 11, 1956, and assigned to the assignee of the present invention, a relatively slow condensation reaction occurs between such reactants and tetracyanoethylene at room temperature to give tricyanovinyl phenols and tricyanovinyl aromatic amines, respectively. On the other hand, the Pi complexes of the present invention form immediately even at low temperature, so formation of condensation products can be substantially avoided by using appropriate conditions for the particular reactants involved, which choice of conditions will be obvious to one skilled in the art.

In addition to the fact that these aromatic Pi complexes of tetracyanoethylene find use based on the formation thereof for the detection and identification of aromatic compounds, these tetracyanoethylene/aromatic Pi complexes have other uses. Thus, the tetracyanoethylene/aromatic Pi complexes with the stronger aromatic Pi bases are paramagnetic and thus have usefulness in recognized uses for paramagnetic materials. These paramagnetic complexes are generically characterized by exhibiting paramagnetic absorption in the electron paramagnetic resonance spectrum (EPR absorption).

A still further use of the aromatic Pi complexes which are paramagnetic resides in an additional characteristic physical property of such complexes. Thus, the tetracyanoethylene Pi complexes with the stronger aromatic Pi bases exhibit strong, broad absorption in the near infrared region, e.g., from 0.5 to 2.0 microns, generally centered around 1.0 micron. Based on this property, such Pi complexes find significant use as a coloring agent, or pigment, in writing inks which will permit reproduction of text matter by thermographic processes.

Thermographic copying represents a convenient and easy method of rapidly copying text material dry. However, operability of the process requires that the text material to be copied must absorb in the infrared. Otherwise, there is no heat buildup and, accordingly, no copy is formed on the thermographic paper. Printed material, wherein the text matter is in pigmented inks, is satisfactory since the pigment materials for these inks do absorb in the infrared. The same is true of typewritten matter, whether it be the original copy or carbon copies thereof, since the text matter is defined by carbon particles which absorb in the infrared. However, most fountain pen inks, and in particular ballpoint inks, achieve their characteristic color through the use of dyes, and in some few instances pigments, which do not absorb in the infrared, but only absorb in the visible. Accordingly, text matter appearing in these types of inks cannot be copied by a thermographic process. The paramagnetic tetracyanoethylene/aromatic Pi base complexes in absorbing in the near infrared permit direct, ready, and easy thermographic copying of lettertext matter defined by inks carrying these complexes as the coloring, or pigmenting, agent.

These aromatic tetracyanoethylene Pi complexes are generically colored and accordingly find use in any of the many well-known and established uses for colored materials. Thus, in the case of the colored solutions, these are useful in obtaining decorative color effects. In the case of the tetracyanoethylene Pi complexes with stronger aromatic Pi bases, the complexes are colored solids irrespective of whether the complex is paramagnetic or not. These colored solid complexes find use in any of the well-established fields, such as dyes, pigments for both paints and plastics, and colored fillers for the latter.

Since all the tetracyanoethylene/aromatic Pi complexes are colored, the controlled formation thereof forms the basis for still another use, viz., the reproduction of text matter by impact printing, i.e., by the pressure formation of graphic images. Thus, one sheet of a carrier, e.g., paper, is impregnated with a solution of tetracyanoethylene and the solvent removed via evaporation, leaving the tetracyanoethylene deposited in, on, and through the paper carrier. Another separate sheet of paper is similarly so treated with an aromatic compound. A laminate of the two sheets will reproduce a colored image in the second sheet made by pressure on the first sheet.

More specifically, a sheet of paper was impregnated as above with tetracyanoethylene from tetrahydrofuran or benzene solutions and the impregnated paper dried, allowing the carrier solvent to evaporate. In those instances, e.g., with benzene, where the solvent for the tetracyanoethylene initially forms a complex with the tetracyanoethylene, the volatile nature of the solvent results in substantially complete evaporation thereof, leaving only the tetracyanoethylene in the paper. Another sheet of paper was similarly impregnated with a solution of hexamethylbenzene and the solvent allowed to evaporate. A two-sheet pack of the two separate sheets was made and writing on the top sheet, such as by a stylus, or typing, such as by being struck with metal typewriter keys, resulted in the formation of a purple-colored image, largely in the surface of the second sheet, of the pressure image made on the top sheet.

Because of the impregnating nature of the just-described treatment, the purple image under the areas of localized pressure extended into the body of the second sheet. There was some formation of a so-called transfer image on the bottom-most surface of the uppermost sheet. Similar results were obtained with tetracyanoethylene and naphthalene. Similar results limited to a surface image in the second sheet were obtained with separate sheets of paper coated with paraffin/vaseline solutions of, respectively, durene and tetracyanoethylene and pentamethylbenzene and tetracyanoethylene.

Since many different embodiments of the invention may be made without departing from the spirit and scope thereof, it is to be understood that the invention is not limited by the specific illustrations except to the extent defined in the following claims.

We claim:
1. The 1:1 Pi complex of tetracyanoethylene and an aromatic compound of up to 16 carbon atoms free from aliphatic unsaturation and selected from the group consisting of carbocyclic aromatic hydrocarbons and substituted carbocyclic aromatic hydrocarbons in which any substituent is selected from the group consisting of lower alkyl, phenyl, hydroxy, lower alkoxy, amino, lower alkylamino, halogen, and halo lower alkyl.
2. The crystalline 1:1 Pi complex of tetracyanoethylene and a carbocyclic aromatic hydrocarbon of up to 16 carbon atoms free from aliphatic unsaturation.
3. The crystalline 1:1 Pi complex of tetracyanoethylene and a substituted carbocyclic aromatic hydrocarbon of up to 16 carbon atoms free from aliphatic unsaturation in which any substituent is lower alkoxy.
4. The crystalline 1:1 Pi complex of tetracyanoethylene and a substituted carbocyclic aromatic hydrocarbon of up to 16 carbon atoms free from aliphatic unsaturation in which any substituent is amino.
5. 1:1 tetracyanoethylene/diaminodurene Pi complex.
6. 1:1 tetracyanoethylene/1,5-diaminonaphthalene Pi complex.
7. 1:1 tetracyanoethylene/trimethoxybenzene Pi complex.
8. 1:1 tetracyanoethylene/N,N,N',N' - tetramethyl - p-phenylenediamine Pi complex.
9. 1:1 tetracyanoethylene/pyrene Pi complex.
10. 1:1 tetracyanoethylene/hexamethylbenzene Pi complex.
11. 1:1 tetracyanoethylene/benzene Pi complex.
12. The process which comprises reacting tetracyanoethylene with an aromatic compound of up to 16 carbon atoms free from aliphatic unsaturation and selected from the group consisting of carbocyclic aromatic hydrocarbons and substituted carbocyclic aromatic hydrocarbons in which any substituent is selected from the group consisting of lower alkyl, phenyl, hydroxy, lower alkoxy, amino, lower alkylamino, halogen, and halo lower alkyl, to form a 1:1 tetracyanoethylene Pi complex of the aromatic compound, and recovering the complex as a crystalline solid.
13. The process of claim 12 wherein the two reactants are mixed and reacted in liquid phase.
14. The process of claim 12 wherein the two reactants are mixed and reacted in an inert solvent.

References Cited in the file of this patent

Price, "Chemical Reviews," volume 29, 1941, pages 57 to 59.
Bergmann, "Acetylene Chemistry," page 80, 1948.
Degering, "An Outline of Organic Nitrogen Compounds," pages 692–702, 1950.